J. S. BROWN.
FRUIT PICKER.
APPLICATION FILED JAN. 28, 1916.
1,195,907.
Patented Aug. 22, 1916.
2 SHEETS—SHEET 1.
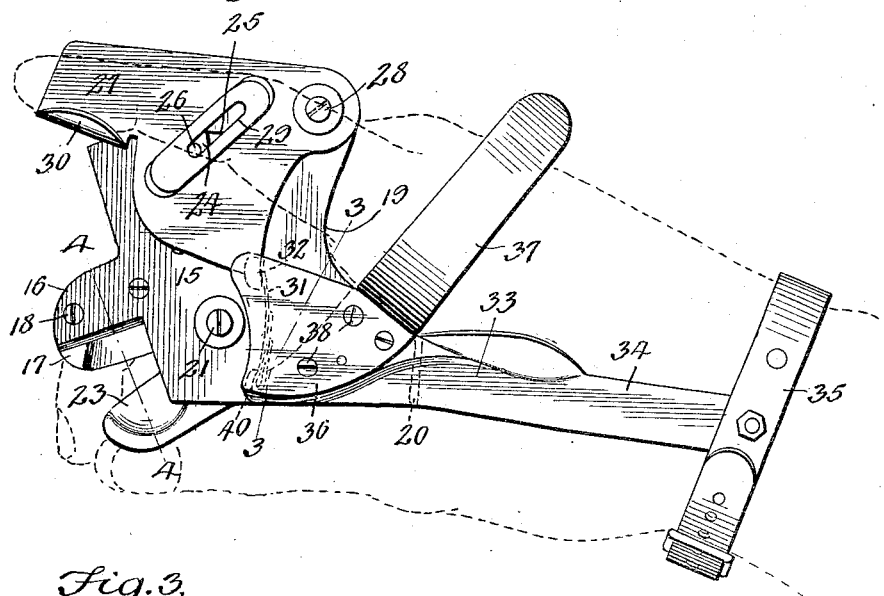
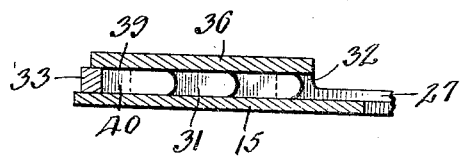
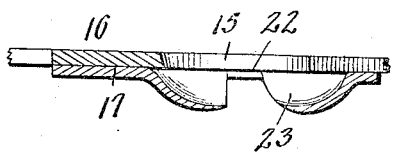
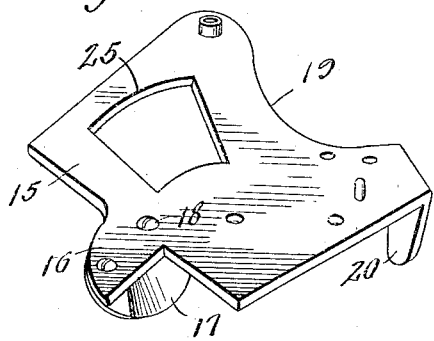
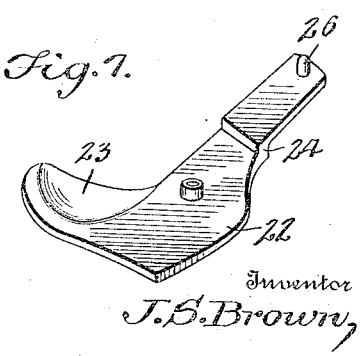
Witnesses
Inventor
J. S. Brown,
By Victor J. Evans
Attorney

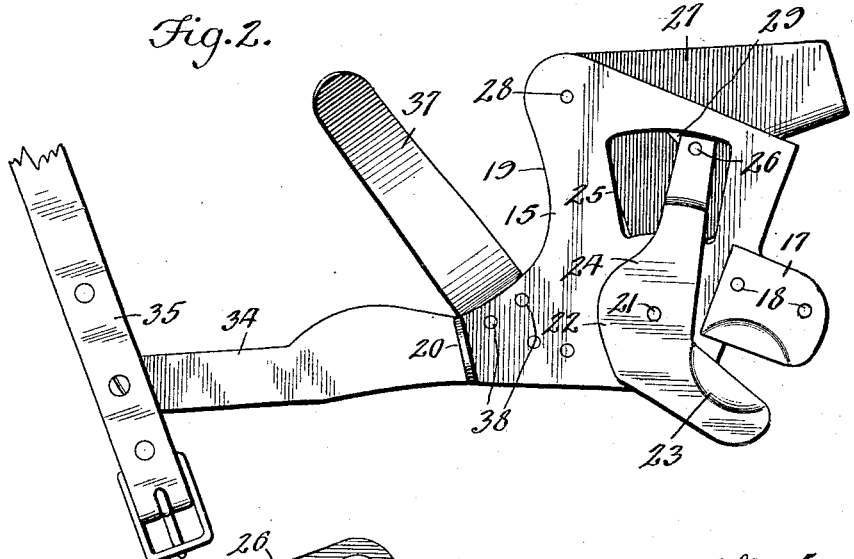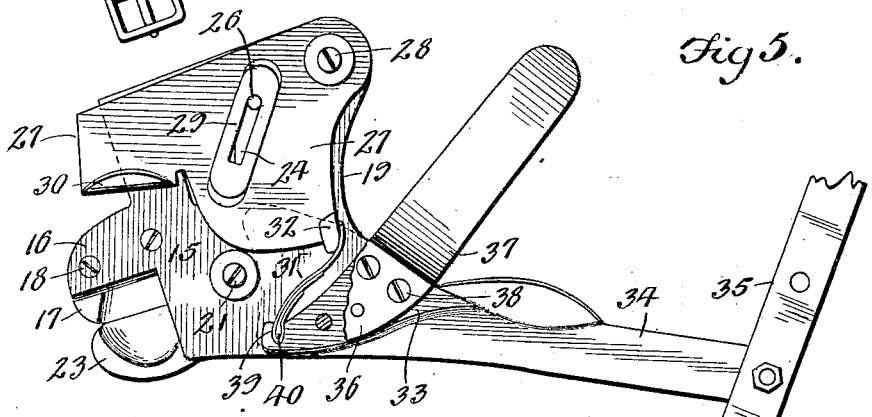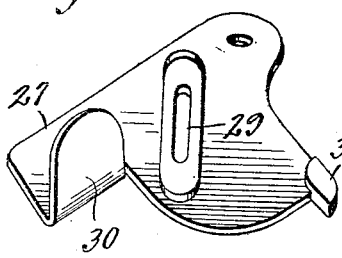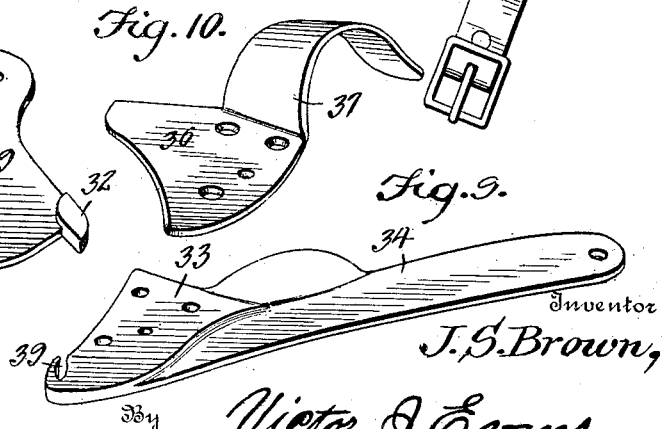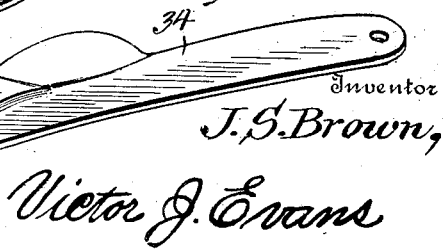

UNITED STATES PATENT OFFICE.

JACOB S. BROWN, OF LOS ANGELES, CALIFORNIA, ASSIGNOR TO WALTER F. EICHENHOFER, OF LOS ANGELES, CALIFORNIA.

FRUIT-PICKER.

1,195,907.  Specification of Letters Patent.  Patented Aug. 22, 1916.

Application filed January 28, 1916. Serial No. 74,814.

*To all whom it may concern:*

Be it known that I, JACOB S. BROWN, a citizen of the United States, residing at Los Angeles, in the county of Los Angeles and State of California, have invented new and useful Improvements in Fruit-Pickers, of which the following is a specification.

This invention relates to fruit pickers of that class or type which is equipped with means for severing the stem of the fruit.

The invention has for its object to produce a simple and improved fruit picker of the class described which may be strapped upon or attached to the hand of the operator in such fashion that the fingers that are not actually employed for operating the clipping or stem severing device may be employed for grasping or holding the fruit to prevent it from dropping to the ground.

A further object of the invention is to simplify and improve the general construction and arrangement of parts constituting the improved device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a device constructed in accordance with the invention, the hand and wrist of the operator being indicated in dotted lines. Fig. 2 is a bottom plan view. Fig. 3 is a sectional detail view taken on the line 3—3 in Fig. 1. Fig. 4 is a sectional detail view taken on the line 4—4 in Fig. 1. Fig. 5 is a top plan view showing the position assumed by the parts of the device when the cutting edges of the blades are in engaging position, parts having been broken away for the better illustration of subjacent parts. Fig. 6 is a perspective detail view of the base plate of the device with the stationary cutting member attached thereto. Fig. 7 is a detail view of the movable cutting member. Fig. 8 is a detail view of the spring actuated lever or member by which the movable cutting member is actuated. Fig. 9 is a detail view of the combined spacer and hand engaging member. Fig. 10 is a detail view of the combined cover plate and hand engaging hook.

Corresponding parts in the several figures are denoted by like characters of reference.

The base plate 15 of the improved device has a forwardly extending arm 16 to which the stationary cutting blade 17 is attached by fastening means such as screws 18. The rearward portion of the base plate has an arcuate base plate 19 adapted to engage between the fore and middle fingers of the hand of the operator, and at one corner is provided a downturned flange or abutment 20.

Supported adjacent to the under face of the base plate and connected therewith by a pivot member 21 is an L-shaped plate 22 which constitutes the movable cutting member, one arm of said plate being shaped to form a blade 23 which coöperates with the stationary cutting blade 17. The other arm 24 of the L-shaped blade 22 is offset upwardly so as to lie within a slot 25 in the base plate 15, said slot being of ample dimensions to permit the member 22 to rock about the axis of the pivot 21 to a sufficient extent to enable the cutting blades 17 and 23 to function properly. The upper face of the upwardly offset portion of the arm 24 lies substantially flush with the top face of the base plate 15, and said upwardly offset portion is provided with a pin 26 that extends upwardly above the face of the base plate.

To operate the movable cutting member 22 a plate or cover member 27 is provided, the same being connected with one of the rearward corner portions of the base plate by a pivot member 28. The said plate or lever member is provided with a diagonal slot 29 which receives the upwardly extending pin 26 of the movable cutting member, and the plate or lever 27 has at its forward portion an upwardly extending flange 30 which constitutes a finger piece whereby the plate or lever member may be actuated against the tension of its actuating spring 31 which engages an upwardly extending lug 32 of the plate or lever member.

A spacer 33 is mounted on the top face of the base plate at the corner which is provided with the downwardly extending flange or abutment 20, said spacer having a hand guard 34 which extends materially beyond the base plate, said hand guard being properly shaped to fit between the thumb and forefinger of the operator. Terminally connected with the hand guard is a wrist encircling strap 35 whereby the device may be strapped to the wrist of the operator, as indicated in Fig. 1. Superposed on the spacer 33 is a housing plate 36 having a hand engaging hook 37, said housing plate, spacer and base plate being assembled together by fastening members, such as screws 38. The spacer has a notch 39 wherein is fitted the enlarged head portion 40 of a flat leaf spring 31, the free end of which engages the upwardly extending lug 32 of the operating plate or lever 27 for the purpose of actuating the latter to move the blade of the movable cutting member apart from the stationary blade 17.

The stationary and movable cutting blades 17 and 23 are concaved on their upper sides and convex on their lower sides to present rounded or arcuate cutting edges, the blades being dished to present the appearance of a shallow bowl, whereby the said blades are enabled to sever the stem of the fruit very close to the fruit without the least danger of bruising the latter, thus making the device particularly applicable for picking oranges and other citrous fruits, although obviously it may be advantageously used for gathering apples, pears and the like.

In the operation of this device the forefinger of the operator is inserted beneath the hook 37, and the hand-engaging member or guard 34 is permitted to extend above the hand between the thumb and fore-finger, after which the strap 35 is tightened about the wrist of the operator. When thus applied the fore-finger of the operator will engage the upwardly extending flange or finger piece of the plate or lever member 27 which may thus be readily moved against the tension of the actuating spring 41, thereby bringing the edges of the cutting blades together to sever the stem of the fruit, the latter being grasped between the thumb and three fingers of the hand of the operator. The fruit may thus be grasped and the stem severed by the use of one hand, thus enabling the operator to sustain himself in position on a ladder or scaffolding with the other hand while the fruit is being picked and deposited in a basket or receptacle.

It will be seen from the foregoing that I have produced a very simple and thoroughly effective device for picking fruits by severing the stems thereof in a clean and positive manner while the fruit which is being picked is held securely by the hand of the operator on which the picking device is mounted, thus leaving the other hand entirely free, and enabling the operator to sufficiently support himself. The actuating spring for the operating lever is housed between the housing plate and the base plate, and the several parts are so constructed and assembled as to operate freely and without danger of being jammed or obstructed. The flange or abutment 20 will engage in the crotch between the thumb and fore-finger of the operator, and will thus tend to maintain the device against displacement under pressure exerted on the flange or finger piece 30 in the act of operating the device.

Having thus described the invention, what is claimed as new, is:—

1. In a fruit picker, a base plate having a forwardly extending arm carrying a stationary cutting blade on its under face, an L-shaped plate pivoted on the under face of the base plate and having one arm provided with a cutting member coöperating with the stationary cutting blade, the other arm of said L-shaped plate being offset upwardly to lie flush with the top of the base plate, the latter being provided with a slot to receive such upwardly offset portion, a lever member fulcrumed on top of the base plate and having a diagonal slot and an upwardly extending flange forming a finger piece, a pin extending from the upwardly offset portion of the cutter carrying L-shaped plate in engagement with said slot, and a spring whereby the lever is actuated in one direction.

2. In a fruit picker, a base plate carrying a stationary cutting member, an L-shaped plate pivoted on the underside of the base plate and having an arm constituting a movable cutting member and another arm which is offset upwardly through the base plate, the latter being provided with a slot to permit rocking movement of the plate having the movable cutting member, a lever fulcrumed on top of the base plate and having a finger piece and a slot, a pin extending from the offset portion of the plate carrying the movable cutting member into said slot, a spacer and a housing plate mounted on the base plate, said spacer having a notch, and a flat spring having a head seated in said notch, the lever member being provided with an upwardly extending lug operating between the base plate and the housing plate and engaged by the spring.

3. In a fruit picker, a base plate having a stationary and a movable cutting member, an actuating lever for the movable cutting member fulcrumed on top of the base plate and having an upwardly extending lug, a spacer and a superposed housing plate mounted on the base plate, said spacer having a notch and said housing plate being extended above the upwardly extending lug of the operating lever to guide the latter, and a spring having a head seated in the notch of the spacer, said spring engaging the lug of the operating lever.

4. In a fruit picker, a base plate having a stationary and a movable cutting member, an operating lever fulcrumed on the base plate, a spacer and a superposed housing mounted on the base plate, said spacer having a hand guard and said housing plate having a hand engaging hook, both extending beyond the base plate, and an actuating spring for the operating lever connected with the spacer and confined between the base plate and the housing plate.

5. In a fruit picker, a base plate having a stationary and a movable cutting member, an operating lever fulcrumed on the base plate, a spacer and a superposed housing mounted on the base plate, said spacer having a hand guard and said housing plate having a hand engaging hook, both extending beyond the base plate, and an actuating spring for the operating lever connected with the spacer and confined between the base plate and the housing plate, the base plate being provided with a downturned abutment flange below the hand guard of the spacer.

In testimony whereof I affix my signature in presence of two witnesses.

JACOB S. BROWN.

Witnesses:
J. L. BUCHANAN,
N. H. REVIS.

Copies of this patent may be obtained for five cents each, by addressing the "Commissioner of Patents, Washington, D. C."